United States Patent
Fairbairn et al.

(10) Patent No.: US 10,402,630 B2
(45) Date of Patent: Sep. 3, 2019

(54) MAINTAINING PRIVACY FOR MULTIPLE USERS WHEN SERVING MEDIA TO A GROUP

(71) Applicant: Sony Interactive Entertainment LLC, San Mateo, CA (US)

(72) Inventors: James Fairbairn, San Mateo, CA (US); Steven Trombetta, San Mateo, CA (US); Vipul Hingne, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 179 days.

(21) Appl. No.: 15/456,238

(22) Filed: Mar. 10, 2017

(65) Prior Publication Data

US 2018/0260534 A1 Sep. 13, 2018

(51) Int. Cl.
*G06F 21/10* (2013.01)
*G06K 9/00* (2006.01)
(Continued)

(52) U.S. Cl.
CPC ..... *G06K 9/00302* (2013.01); *G06F 21/6245* (2013.01); *H04L 67/22* (2013.01);
(Continued)

(58) Field of Classification Search
None
See application file for complete search history.

(56) References Cited

U.S. PATENT DOCUMENTS

| 7,533,113 | B1 * | 5/2009 | Haddad | G06Q 30/02 |
| 8,578,501 | B1 * | 11/2013 | Ogilvie | H04L 67/10 |
| | | | | 726/26 |

(Continued)

FOREIGN PATENT DOCUMENTS

| CN | 2014081770 | * 10/2015 | G06F 21/60 |
| WO | WO 2015/158045 | 10/2015 | |
| WO | WO 2018/165562 | 9/2018 | |

OTHER PUBLICATIONS

PCT/US18/21764, Maintaining Privacy for Multiple Users When Serving Media to a Group, filed Mar. 9, 2018.
(Continued)

*Primary Examiner* — Piotr Poltorak
(74) *Attorney, Agent, or Firm* — Polsinelli LLP

(57) ABSTRACT

An apparatus for maintaining privacy when providing media content to a group includes at least one sensor coupled to a processor that is configured to observe, based on sensor data from the sensor(s), that more than one user is engaged with the apparatus, and to obtain user identities for at least a first user and a second user engaged with the apparatus. The processor looks-up a first privacy preference for the first user and a second privacy preference for the second user based on the user identities of both users. The processor determines restricted content based on the first privacy preference and the second privacy preference and determines and outputs for display suggested content for engagement by the first user and the second user, based on the restricted content, where the suggested content satisfies criterion for the first privacy preference and the second privacy preference.

19 Claims, 6 Drawing Sheets

(51) Int. Cl.
  *H04L 29/08* (2006.01)
  *G06F 21/62* (2013.01)
  *H04L 29/06* (2006.01)
  *H04W 4/08* (2009.01)
(52) U.S. Cl.
  CPC ........ *H04L 63/0421* (2013.01); *H04L 63/104* (2013.01); *H04L 67/306* (2013.01); *H04W 4/08* (2013.01)

(56) References Cited

U.S. PATENT DOCUMENTS

| | | | |
|---|---|---|---|
| 9,241,036 B2 | 1/2016 | Zuckerberg et al. | |
| 9,326,027 B2 | 4/2016 | Mountain | |
| 2008/0046976 A1* | 2/2008 | Zuckerberg | H04L 63/102 726/4 |
| 2009/0138276 A1* | 5/2009 | Hayashida | G06Q 10/10 705/325 |
| 2009/0199105 A1* | 8/2009 | Kamada | G06Q 10/10 715/738 |
| 2010/0210281 A1* | 8/2010 | Xue | H04W 4/02 455/456.1 |
| 2014/0222704 A1 | 8/2014 | Abhyanker | |
| 2015/0067708 A1 | 3/2015 | Jensen et al. | |
| 2016/0080352 A1 | 3/2016 | Okamoto et al. | |
| 2016/0140671 A1 | 5/2016 | Hong | |
| 2016/0188902 A1* | 6/2016 | Jin | G06F 21/6245 726/28 |
| 2016/0261532 A1* | 9/2016 | Garbin | H04L 51/04 |
| 2017/0091713 A1* | 3/2017 | Paris | G06Q 10/1093 |
| 2018/0137267 A1* | 5/2018 | Krieger | G06F 21/316 |
| 2018/0247075 A1* | 8/2018 | Aistrope | G06F 21/6245 |

OTHER PUBLICATIONS

PCT Application No. PCT/US2018/021764 International Search Report and Written Opinion dated May 17, 2018.

* cited by examiner

US 10,402,630 B2

MAINTAINING PRIVACY FOR MULTIPLE USERS WHEN SERVING MEDIA TO A GROUP

BACKGROUND OF THE INVENTION

Field of the Invention

This application relates to multimedia devices, and more particularly to a system and method for providing media content to multiple users while maintaining privacy for all served users.

Description of the Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title. The digital content file typically includes sequential content data, organized according to playback chronology, and may comprise audio data, video data, or a combination thereof.

The content player is configured to download and play a digital content file, in response to a user request selecting the title for playback. The user is typically presented with a set of recommended titles for selection. Such recommendations are based primarily on previous operations and/or selections performed by the user.

A streaming media service generally includes a content server, a content player, and a communications network connecting the content server to the content player. The content server is configured to store (or provide access to) media content made available to end users. Media content may include, movies, videos, music, games, social applications, etc.

The content player can suggest media content to one or more users based on the interests of the users. Such interests may be determined by the viewing or search history of the users. However, current systems do not take into account the privacy preferences of the users in making the media content suggestions that will be noticed by other users.

SUMMARY OF THE PRESENTLY CLAIMED INVENTION

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later. In accordance with one or more aspects of the examples described herein, systems and methods are provided for providing community driven content.

In an aspect, an apparatus for maintaining privacy when providing media content to a group includes at least one sensor for recording sensor data at a first location, a network interface, a memory, and a processor connected to the sensor, the network interface, and the memory. The processor is configured to observe that more one than one user is engaged with the apparatus, based on the sensor data and obtain user identities for at least a first user and a second user engaged with the apparatus, based on the sensor data. The processor looks-up a first privacy preference for the first user based on the user identity for the first user and looks-up a second privacy preference for the second user based on the user identity for the second user. The processor determines restricted content based on the first privacy preference and the second privacy preference and determines suggested content for engagement by the first user and the second user, based on the restricted content, where the suggested content satisfies criterion for the first privacy preference and the second privacy preference. The processor then outputs the suggested content to at least one connected display or audio device.

In a second aspect, maintaining privacy when providing community driven content to a group by a media distribution device includes observing that more one than one user is engaged with the apparatus, based on the sensor data and obtaining user identities for at least a first user and a second user engaged with the apparatus, based on the sensor data. The media distribution device looks-up a first privacy preference for the first user based on the user identity for the first user and looks-up a second privacy preference for the second user based on the user identity for the second user. The media distribution device determines restricted content based on the first privacy preference and the second privacy preference. The media distribution device determines suggested content for engagement by the first user and the second user, based on the restricted content, where the suggested content satisfies criterion for the first privacy preference and the second privacy preference. The media distribution device outputs the suggested content to at least one connected display or audio device.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for initializing a panoramic video, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

A streaming media service generally includes a content server, a content player, and a communications network connecting the content server to the content player. The content server is configured to store (or provide access to) media content made available to end users. Media content may include movies, videos, music, games, social applications, etc. The content player can suggest media content to one or more users based on the interests of the users. The content player can also suggest media content to be viewed or played together with other users connected online as a social experience. Such interests may be determined by the viewing or search history of the users.

The present technology allows the media content suggestions to take into account the privacy preferences and concerns for users of the content player when multiple people are engaged. A user may not wish for another user to know his viewing preferences when a media content suggestion is made. The subject disclosure provides systems and methods for determining privacy preferences for multiple users and suggesting media content that abides by the privacy preferences.

Figure 1:
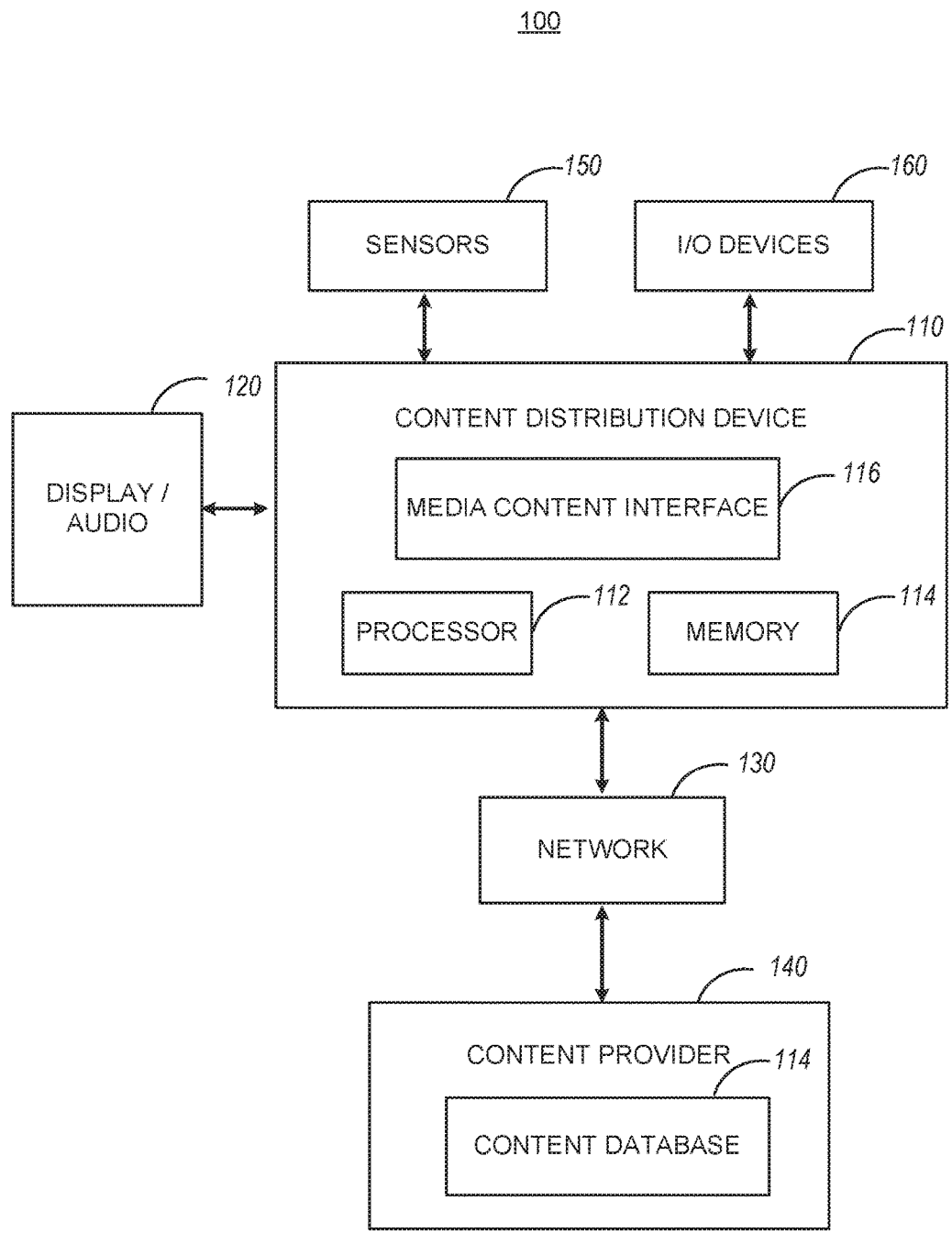
FIG. 1 illustrates a block diagram of an example infrastructure 100 for maintaining privacy when providing media content with to a group, according to one implementation of the invention.

FIG. 1 illustrates a block diagram of an example infrastructure 100 for maintaining privacy when providing media content to a group, according to one implementation of the invention. As shown, the infrastructure 100 includes a content provider 140 and a media distribution device 110, each connected to a network 120.

In an example implementation, one or more media distribution devices 110 are located in each residential home or small business, while the content provider 140 exists across one or more data centers. A data center is a facility used to house computer systems and associated components, such as powerful data processing, telecommunications, and storage systems.

The network 120 can include a wide area network (WAN) such as the Internet, or a local area network (LAN). The network 101 can include an intranet, a storage area network (SAN), a personal area network (PAN), a metropolitan area network (MAN), a wireless local area network (WLAN), a virtual private network (VPN), a cellular or other mobile communication network, a wireless local area networking (WiFi) network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

The media distribution device 110 connects to the content provider 140 through the network 101 via one or more Internet Service Providers (ISPs). An ISP is an organization that provides services for accessing and using the Internet. Internet Service Providers may be organized in various forms, such as commercial, community-owned, non-profit, or otherwise privately owned. Internet services typically provided by ISPs include Internet access, Internet transit, domain name registration, web hosting, Usenet service, and colocation. Each ISP typically serves large groups of Internet users in a geographic area.

The media distribution device 110 communicates with the content provider 140 over the network 120 to obtain media content (e.g., movies, videos, music, games, social applications, etc.). The media distribution device 110 includes at least a processor 112 and a memory 114 for storing data. In this particular example, the media distribution device 110 represents a processing device running a media content interface 116.

The media content interface 116 is configured to obtain media content from the content provider 140, to be rendered on a display 120 (e.g., a tablet, a smartphone, a monitor, a television, and/or a head-mounted display (HMD) for virtual reality (VR) or augmented reality (AR). The display 120 can additionally or alternatively include an audio output device such as a multimedia sound system or integrated speakers for outputting audio content.

Figure 3:
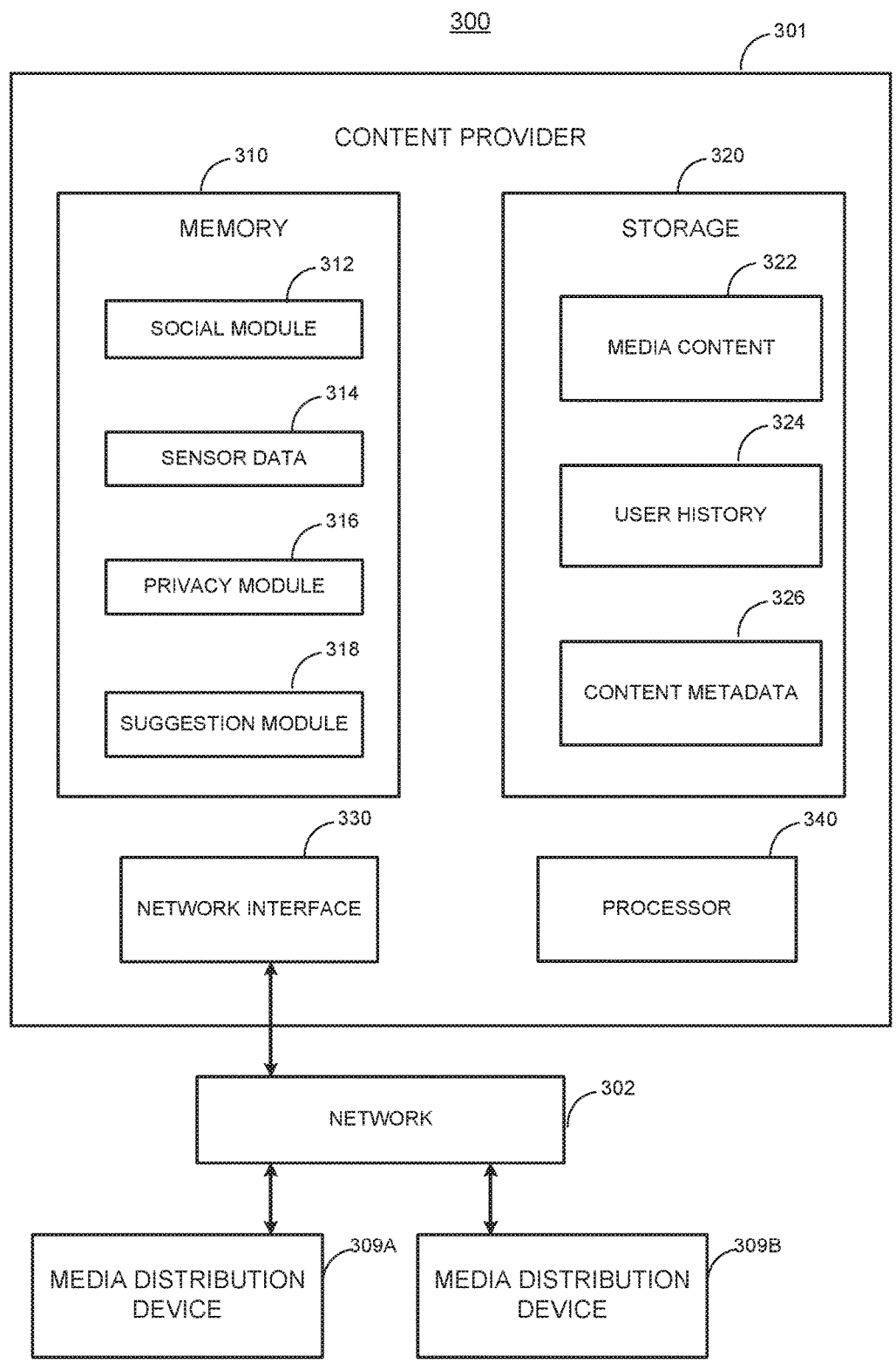
FIG. 3 illustrates a block diagram of an example content provider, according to one implementation of the invention.

The media distribution device 110 represents a set-top device connected to both the network 120 and the display 140 (e.g., a flat-panel television). Accordingly, media distribution device 110 is representative of digital cable boxes, digital video recorder (DVR) systems, video game consoles, and other media devices capable of connecting to a network 120 and receiving and playing back media streams provided by content provider 140. In such a case, the disc player could connect to the content provider 140 and download interface components used to select and playback media streams. Further, the display 140 may itself be an integrated device capable of connecting to the network 120 playing back media streams supplied by the content provider 140. For example, some television displays include integrated components used to connect to a streaming media service, video on demand services, or video sharing websites. FIG. 3 describes in more detail an example media distribution device 110.

One or more input/output (I/O) devices 160 are connected (e.g., via wired cable or wireless connection such as WiFi or BLUETOOTH®) to or integrate into the he media distribution device 110. The I/O devices 160 can include, for example, a keyboard, a mouse, a remote control, a controller, a microphone, a television, a head mounted display (HMD), and/or a monitor, etc.

One or more sensors 150 devices 160 are connected to or integrate into the media distribution device 110. The sensors 150 can include, for example, cameras, microphones, radars, Light Detection and Ranging (LIDAR) sensors, pressure sensors, wearable sensors, haptic sensors, or smart home appliances for detecting user location and/or activity. The sensors 301 provide various sensor data to the media distribution device 301. For example, the sensor data from a camera or microphone can allow the MEDIA distribution device 110 to determine how many people are in a room and their identities.

The sensor data is interpreted by the media distribution device 110 and/or the content provider 114. Because the media distribution device 110 may have much lower processing power than the content provider 114, computationally intensive sensor data interpretation may occur at the content provider 114. In some implementations, the media distribution device 110 may perform rudimentary data interpretation locally, but send the sensor data for complex processing to the content provider 114 over the network 130.

The sensors 150 may be integrated to the media distribution device 110 or can be external to the media distribution device. Sensors 150 located external to the media distribution device 110 are connected the media distribution device 301 via a wired cable or via a wireless connection such as WiFi or BLUETOOTH®. FIG. 3 describes in more detail the sensors 150 for use with the media distribution device 110.

Although only one media distribution device is shown in FIG. 1, in some implementations, the content provider 140 may serve a large number of media distribution devices 110. The content provider 140 provides a computing system configured to transmit media content to the media distribution device 110 (as well as other media distribution devices not shown). For example, content provider 140 may include a web-server, database, and/or application server configured to respond to requests for web pages and/or streaming media files received from the media distribution device 110. The media content itself may be distributed from the content provider 140 or through broader content distribution networks.

For example, in some implementations, the content provider 140 may allow users to authenticate themselves to the content provider 140 (e.g., using a username and password or using voice, fingerprint, or facial recognition). Once a given user is authenticated, the user may receive suggestions for activities from the content provider 140. The media distribution device 110 and/or content provider 140 may use relationships between user activities to generate a set of suggested activities and serve the set of activities to the user via the display 120. The media distribution device 110 downloads from the content provider 140 and plays one of the suggested activities. In addition to generating the set of suggested activities, the content provider 140 may also use relationships and between user activities and activity history of the user to generate other activity suggestions and recommendations, to present on the media distribution device 110. FIG. 3 describes in more detail the generation of suggested actions for users of the home entertainment device 110.

The content provider 140 can include any computing or processing device, such as for example, one or more computer servers. The content provider 140 can be a single device, multiple devices in one location, or multiple devices in multiple locations. FIG. 3 describes in more detail example content provider configurations.

Figure 2:
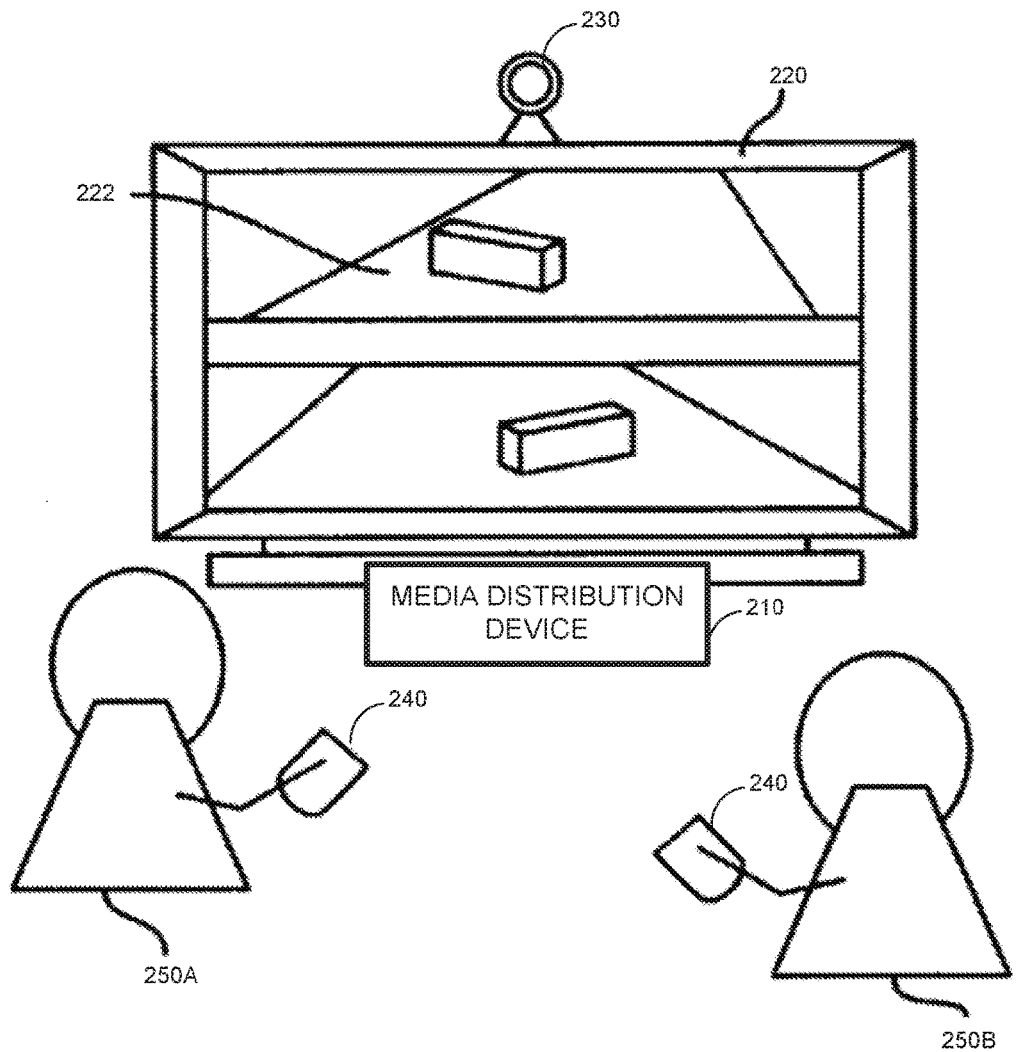
FIG. 2 illustrates usage of an example media distribution device, according to one implementation of the invention.

FIG. 2 illustrates usage 200 of an example media distribution device 210, according to one implementation of the invention. As shown, two users 250A, 250B are able to view a television display 220. The media distribution device 210 is connected to the television display 220 and one or more sensors 230. In some implementations, the media distribution device 210 is connected to a network such as a wide area network (WAN) such as the Internet, or a local area network (LAN). The media distribution device 210 can also be used "offline" without connecting to a network.

It is noted that the television display 220 is merely one example of multiple display device options for use with the present disclosure. Other display options include a monitor, television, tablet, or smartphone with a liquid crystal display (LCD), light-emitting diode (LED), or organic light-emitting diode (OLED) panel, etc. In some implementations, an audio output device (e.g., speakers) can be used in addition to the display 220 or in alternative to the display 220 to play audio media content for the users 250A, 250B.

The sensors 230 can include, for example, cameras, microphones, radars, Light Detection and Ranging (LIDAR) sensors, pressure sensors, wearable sensors, haptic sensors, or smart home appliances for detecting user location and/or activity. The sensors 230 allow the media distribution device 210 to automatically determines how many people are in the area, whether they are registered users, and their user identities. In this case, media distribution device 210 determines that the two users 250A, 250B are in the area.

The one of the users 250A, 250B may command the media distribution device 210 to search for or suggest a media content. For example, one of the users 250A, 250B may command the media distribution device 210 using an input device 240. In some implementations, the input device 240 may be a remote controller, a game controller, a joystick, a mouse, a keyboard, a touchscreen, a trackpad, or other similar control device. For example, one of the users 250A, 250B may command the media distribution device 210 using the input device 240 to play a recently released feature film. In some implementations, the media distribution device 210 can use the sensors 230 to receive voice or gesture commands from the users 250A, 250B.

The media distribution device 210 then makes suggestions for media content 222 to be displayed on the television display 220 that satisfies privacy preferences of one or both of the users 250A, 250B. In some implementations, the privacy preferences for the users 250A, 250B may be manually input by the users 250A, 250B on the input device 240. The privacy preferences can also or alternatively be automatically determined by the media distribution device 210 using sensor data from the sensors 230 and/or user history, as described in more detail in FIGS. 3 and 4.

In some implementations, the media distribution device 210 suggests engaging watching/playing the suggest media content 22 with an online remote user (not shown) connected over a network. For example, the online remote user can be an individual from a list of friends on one of the users' 250A, 250B social network. The online remote user may be chosen based on similar interests and/or schedules, in addition to satisfying the privacy preferences of the users 250A, 250B.

FIG. 3 illustrates a block diagram 300 of an example content provider 301, according to one implementation of the invention. As shown, the content provider 301 includes a processor 340, a network interface 330, a memory 310, and a storage 320. The content provider 301 connects to multiple media distribution devices 309A, 309B over a network 302.

The network 302 can include a wide area network (WAN) such as the Internet, or a local area network (LAN). The network 302 can include an intranet, a storage area network (SAN), a personal area network (PAN), a metropolitan area network (MAN), a wireless local area network (WLAN), a virtual private network (VPN), a cellular or other mobile communication network, a wireless local area networking (WiFi) network, a BLUETOOTH® wireless technology connection, a near field communication (NFC) connection, any combination thereof, and any other appropriate architecture or system that facilitates the communication of signals, data, and/or messages.

The processor 340 retrieves and executes programming instructions stored in the memory 310. Similarly, the processor 340 stores and retrieves application data residing in the memory 310. The processor 340 is included to be representative of a single CPU, multiple CPUs, a single CPU having multiple processing cores, and the like. And the memory 310 is generally included to be representative of a random access memory. The memory 310 can include any physical device used to temporarily or permanently store data or programs, such as various forms of random-access memory (RAM).

The memory 310 can include any physical device used to temporarily or permanently store data or programs, such as various forms of random-access memory (RAM). The storage 320 may be a disk drive storage device. Although shown as a single unit, the storage 320 may be a combination of fixed and/or removable storage devices, such as magnetic disc drives, solid state drives (SSD), removable memory cards, optical storage, network attached storage (NAS), or a storage area-network (SAN). The storage 320 can include any physical device for non-volatile data storage such as a HDD or a flash drive. The storage 320 can often have greater capacity than the memory 310 and can be more economical per unit of storage, but can also have slower data transfer rates.

Storage 330 includes media content 322, a user history 324, and content metadata 326. Media content 322 includes a library of media content available for download or streaming by a media distribution device 309. Accordingly, the media content 322 may include a collection of audio/video/game data encoded at various bitrates and stored on the content provider 301.

The user history 324 is representative of one or more log entries which store user/session data, including data relating to activities undertaken by various users of a number of media distribution device 309s. Such activities may include, e.g., playing a video game title, listening to a music track, viewing a media content, performing a search, viewing links, etc. The log entries may include, for example, a user identification (ID), media content played by the user, a timestamp of when the play started, and a timestamp of when the play ended. The log entries may include text of a search query entered by the user, and a timestamp of when the search query was received. The user history 324 may include user IDs of each user subscribing to the streaming media service, and may also include usernames, password data, user preferences and settings, and other user information.

The content metadata 326 in the storage 320 may include media content rollups, whether media content are available at various times, and other information relating to media content. For example, content metadata for videos may include automatically collected video metadata from software or a device such as a video camera. The metadata stores camera-created information such as aperture, shutter speed, GPS coordinates and more in the video file. The standard format is Exchangeable Information File Format (EXIF). Most EXIF data cannot be edited after capture. Manually written video metadata provides additional information about the video content. Manual metadata can include transcripts of dialogue or conversations and other text descriptions. Such text entries are readable by computers and provide efficient searching.

As discussed in greater detail below, the user history 324 and content metadata 326 may be used to identify topics cause privacy concerns for a user. For example, the user history 324 and content metadata 326 may be used to predict user topics that cause privacy concerns based on relationships between media content and searches of queries. The content provider 301 can use the predicted user behavior and preferences, either alone or in combination with other data, to generate privacy preferences.

The memory 310 includes a social module 312, sensor data 314, a privacy module 316, and a suggestion module 318. The social module 312 is an application that determines possible social interactions for users of different media distribution device 309s. In some implementations, the social module 312 analyzes calendar schedules, historical activity, preferences, and interests for a group of users to determine possible social activities between the group of users. The group of users may be friends or acquaintances on a social network. The group of users may also be strangers and have no prior social interactions. The social module 312 may predict which group of users may have the best probability of compatibility and therefore have increased engagement with their media distribution device 309s. For example, the social module 312 may determine that two specific users are friends on a social network and both enjoy playing first person shooter games on weeknights, and therefore group those two specific users together.

The sensor data 314 is received from the media distribution device 309 over the network 302. Sensors connected to the media distribution device 309 provide various sensor data to the media distribution device 301 and/or to the content provider 301. For example, the sensor data 314 from a camera or microphone can allow the content provider 301 to determine how many people are in a room and their identities.

The sensor data 314 is interpreted by the media distribution device 309 and/or the content provider 301. Because the media distribution device 309 may have much lower processing power than the content provider 301, computationally intensive sensor data interpretation may occur at the content provider 301. In some implementations, the media distribution device 309 may perform rudimentary data interpretation locally, but send the sensor data for complex processing to the content provider 301 over the network 302.

The privacy module 316 is an application that determines privacy preferences for users of each media distribution device 309A, 309B. In some implementations, the privacy module 316 is also or alternatively included in each media distribution device 309A, 309B. Privacy preferences include information on what topics user is comfortable with and what topics the user wishes to stay private. For example, a user may not wish others to know that he likes romantic comedy feature films, but is open about his preference for first-person shooter games.

In addition to information about private media content topics, the privacy preferences of a user may also include different levels of privacy based on the audience present. For example, a user may be comfortable with his roommate knowing that he likes cat videos, but does not wish for anyone else to know. In another example, a user may have no privacy requirements when engaging in media content with individuals online he does not personally know offline. In a third example, a user may have no privacy requirements when engaging with individuals online when his personal identity is anonymous.

In some implementations, the privacy preferences for the users of the media distribution device 309A may be manually input by the users of the media distribution device 309A with an input device, voice commands, or hand gestures, etc.

In some implementations, the privacy module 316 automatically determines the privacy preferences of the users of each media distribution device 309A, 309B. For example, the privacy module 316 may analyzes chat messages, historical viewing activity, media searches, and media engagement time and frequency, for a user of the media distribution device 309A to determine what topics user is comfortable with and what topics the user wishes to stay private, as well as which groups of individuals the user is private with. For example the privacy module 316 may analyze based on a user's viewing history that the user frequently watches political news on television when he is alone, but never watches political news when his roommate is also watching television. In another example, the user may have had chat conversations with a friend over a social network that suggest that he is a fan of children's cartoons, but does not wish his wife to know.

The suggestion module 318 is an application that analyzes the social interactions from the social module 312, the sensor data 314, the user history 324, and the privacy preferences from the privacy module 316 to determine one or more suggested activities for continued user engagement with the media distribution device 309. For example, a first user of a first media distribution device 309A may be uncomfortable playing single-player video games when another person is in the room. The suggestion module 318 may suggest that the first user to play a single-player role-playing game (RPG). When a second user of the first media distribution device 309A enters the room, the suggestion module 318 may suggest that the first user and the second user watch a feature film together. The suggestion module 318 may then suggest for the first user of the first media distribution device 309A to play a first person shooter multiplayer game online with a friend (e.g., a friend of the first user on a social network playing on a second media distribution device 309B).

In some implementations, the suggestion module 318 suggests engaging watching/playing the suggest media content with an online remote user 309B connected over a network. For example, the online remote user can be an individual from a list of friends on a social network of one of the users of the media distribution device 309A. The online remote user the media distribution device 309A may be chosen based on similar interests and/or schedules, in addition to satisfying the privacy preferences of the users of the media distribution device 309A.

Figure 4:
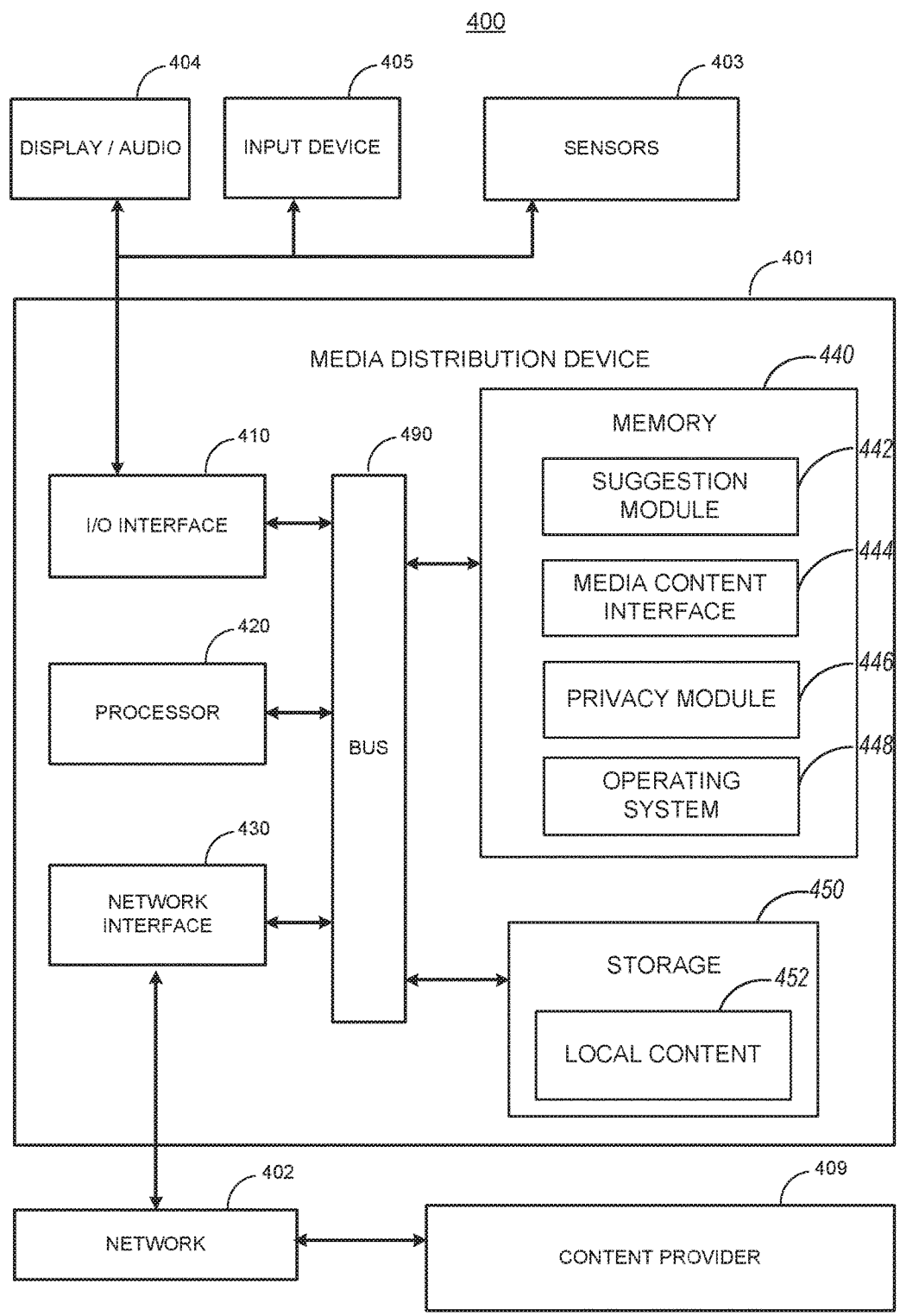
FIG. 4 illustrates a block diagram of an example media distribution device, according to one implementation of the invention.

FIG. 4 illustrates a block diagram 400 of an example media distribution device 401, according to one implementation of the invention. As shown, the media distribution device 401 includes, without limitation, an I/O interface 410 a processor 420, a network interface 430, a bus 490, a memory 440, and a storage 450. The bus 490 connects the I/O interface 410, the processor 420, the network interface 430, the memory 440, and the storage 450.

The I/O interface 410 connects I/O devices to the media distribution device 401. For example, I/O devices include input devices 405 such as a keyboard, mouse, or remote control. A user of the media distribution device 401 can use one of the input devices 405 to enter various commands.

Example display/audio devices 404 include a monitor, television, tablet, or smartphone with a liquid crystal display (LCD), light-emitting diode (LED), or organic light-emitting diode (OLED) panel, etc. The media distribution device 401 can output media content on the display/audio devices 404 for the user to enjoy.

The media distribution device 401 connects to a content provider 409 over the network 402. The network interface 450 is configured to transmit data to and from network 402, such as for example, to download media content from and/or transmit sensor data to the server system 105.

The processor 420 can include single central processing unit (CPU), multiple CPUs, a single CPU having multiple processing cores, etc. For example, the processor can 420 be a chip on a motherboard that can retrieve and execute programming instructions stored in the memory 440.

One or more sensors devices 403 are connected to or integrate into the media distribution device 401. The sensors 403 can include, for example, cameras, microphones, radars, Light Detection and Ranging (LIDAR) sensors, pressure sensors, wearable sensors, haptic sensors, or smart home appliances for detecting user location and/or activity. The sensors 401 provide various sensor data to the media distribution device 401.

The sensor data is interpreted by the media distribution device 401 and/or the content provider. Because the media distribution device 401 may have much lower processing power than the content provider, computationally intensive sensor data interpretation may occur at the content provider. In some implementations, the media distribution device 401 may perform rudimentary data interpretation locally, but send the sensor data for complex processing to the content provider over the network 402.

For example, cameras can provide sensor data that allows the media distribution device 401 to determine a variety of information about users and their environment. In some implementations, one or more of various image processing and/or machine vision algorithms known in the art can be used to interpret the sensor data from the cameras. For example, the media distribution device 401 can determine from the sensor data how many users are in a room, if any, and their user identity. The media distribution device 401 can determine from the sensor data what activities one or more users in the room are engaged in, such as for example, resting on couch, eating a meal, in conversation, etc. In another example, the media distribution device 401 can determine from the sensor data facial expressions and moods of the users. For example, the media distribution device 401 can determine the mood of a user if the sensor data shows that the user is smiling or frowning.

Audio sensors such as microphones can provide sensor data that allows the media distribution device 401 to determine a variety of information about users and their environment. One or more of various speech and sound processing algorithms known in the art can be used to interpret the sensor data from the microphones. For example, the media distribution device 401 can determine from the sensor data voice commands. The audio sensors can also allow the media distribution device 401 to passively receive sensor data for determining user preferences, behavior patterns, moods, schedules, etc. For example, the media distribution device 401 can determine the mood of a user based on voice tonality and/or positive (e.g., "I like this song") or negative (e.g., "what else is on TV?") speech. For example, the media distribution device 401 can determine the schedule of a user based on speed (e.g., "I have a doctor's appointment tomorrow morning at 8 am" or "I need to get to bed in an hour").

Wearable and haptic sensors can provide sensor data that allows the media distribution device 401 to determine user health and other body status information. For example, a smart watch can provide sensor data to the media distribution device 110 for heart rate of a user.

The sensors 403 may be integrated to the media distribution device 401 or can be external to the media distribution device. Sensors 403 located external to the media distribution device 401 are connected the media distribution device 401 via a wired cable or via a wireless connection such as WiFi or BLUETOOTH®.

The memory 440 can include any physical device used to temporarily or permanently store data or programs, such as various forms of random-access memory (RAM). The storage 450 may be a disk drive storage device. Although shown as a single unit, the storage 450 may be a combination of fixed and/or removable storage devices, such as magnetic disc drives, solid state drives (SSD), removable memory cards, optical storage, network attached storage (NAS), or a storage area-network (SAN). The storage 450 can include any physical device for non-volatile data storage such as a HDD or a flash drive. The storage 450 can often have greater capacity than the memory 440 and can be more economical per unit of storage, but can also have slower data transfer rates.

Storage 430, such as a hard disk drive or solid-state (SSD) storage drive, may store media content 452 locally on the media distribution device such as files for an operating system, applications, games, videos, audio, user preferences, logs, and any other data.

The memory 440 stores data to be conveniently accessed by the processor 420 such as a suggestion module 442, a media content interface 444, a privacy module 446, and an operating system 448. The operating system 448 is system software that manages computer hardware and software resources and provides common services for computer programs.

The media content interface 444 is a software application that allows a user to access, browse, search, and play media content such as movies, videos, music, games, social applications, etc. The media content may be locally available on the storage 450 of the media distribution device 401 or be available over the network 402 (e.g., stored at a content provider or a peer media distribution device).

In some implementations, the media content interface 444 may permit a user to enter search queries for transmission to the content provider via the network 402. Content found and downloaded from the content provider or a peer media distribution device may be stored in storage 450 as buffered media content prior to being decoded and played by the media content interface 444.

The privacy module 446 is an application that determines privacy preferences for users of each media distribution device 401. In some implementations, the privacy module 446 is also or alternatively included in the content provider 409. Privacy preferences include information on what topics user is comfortable with and what topics the user wishes to stay private. For example, a user may not wish others to know that he likes romantic comedy feature films, but is open about his preference for first-person shooter games.

In addition to information about private media content topics, the privacy preferences of a user may also include different levels of privacy based on the audience present. For example, a user may be comfortable with his roommate knowing that he likes cat videos, but does not wish for anyone else to know. In another example, a user may have no privacy requirements when engaging in media content with individuals online he does not personally know offline. In a third example, a user may have no privacy requirements when engaging with individuals online when his personal identity is anonymous.

In some implementations, the privacy preferences for the users of the media distribution device 401 may be manually input by the users of the media distribution device 401 with an input device, voice commands, or hand gestures, etc.

In some implementations, the privacy module 446 automatically determines the privacy preferences of the users of each media distribution device 401. For example, the privacy module 446 may analyzes chat messages, historical viewing activity, media searches, and media engagement time and frequency, for a user of the media distribution device 401 to determine what topics user is comfortable with and what topics the user wishes to stay private, as well as which groups of individuals the user is private with. For example the privacy module 446 may analyze based on a user's viewing history that the user frequently watches political news on television when he is alone, but never watches political news when his roommate is also watching television. In another example, the user may have had chat conversations with a friend over a social network that suggest that he is a fan of children's cartoons, but does not wish his wife to know.

The suggestion module 442 is an application that analyzes social interactions, the sensor data, the user history, and the privacy preferences from the privacy module 446 to determine one or more suggested activities for continued user engagement with the media distribution device 401. For example, a first user of a first media distribution device 401 may be uncomfortable playing single-player video games when another person is in the room. The suggestion module 442 may suggest that the first user to play a single-player role-playing game (RPG). When a second user of the first media distribution device 401 enters the room, the suggestion module 442 may suggest that the first user and the second user watch a feature film together. The suggestion module 442 may then suggest for the first user of the first media distribution device 401 to play a first person shooter multiplayer game online with a friend (e.g., a friend of the first user on a social network playing on a second media distribution device).

In some implementations, the suggestion module 442 suggests engaging watching/playing the suggest media content with an online remote user (not shown) connected over a network. For example, the online remote user can be an individual from a list of friends on a social network of one of the users of the media distribution device 401. The online remote user the media distribution device 401 may be chosen based on similar interests and/or schedules, in addition to satisfying the privacy preferences of the users of the media distribution device 401.

Figure 5:
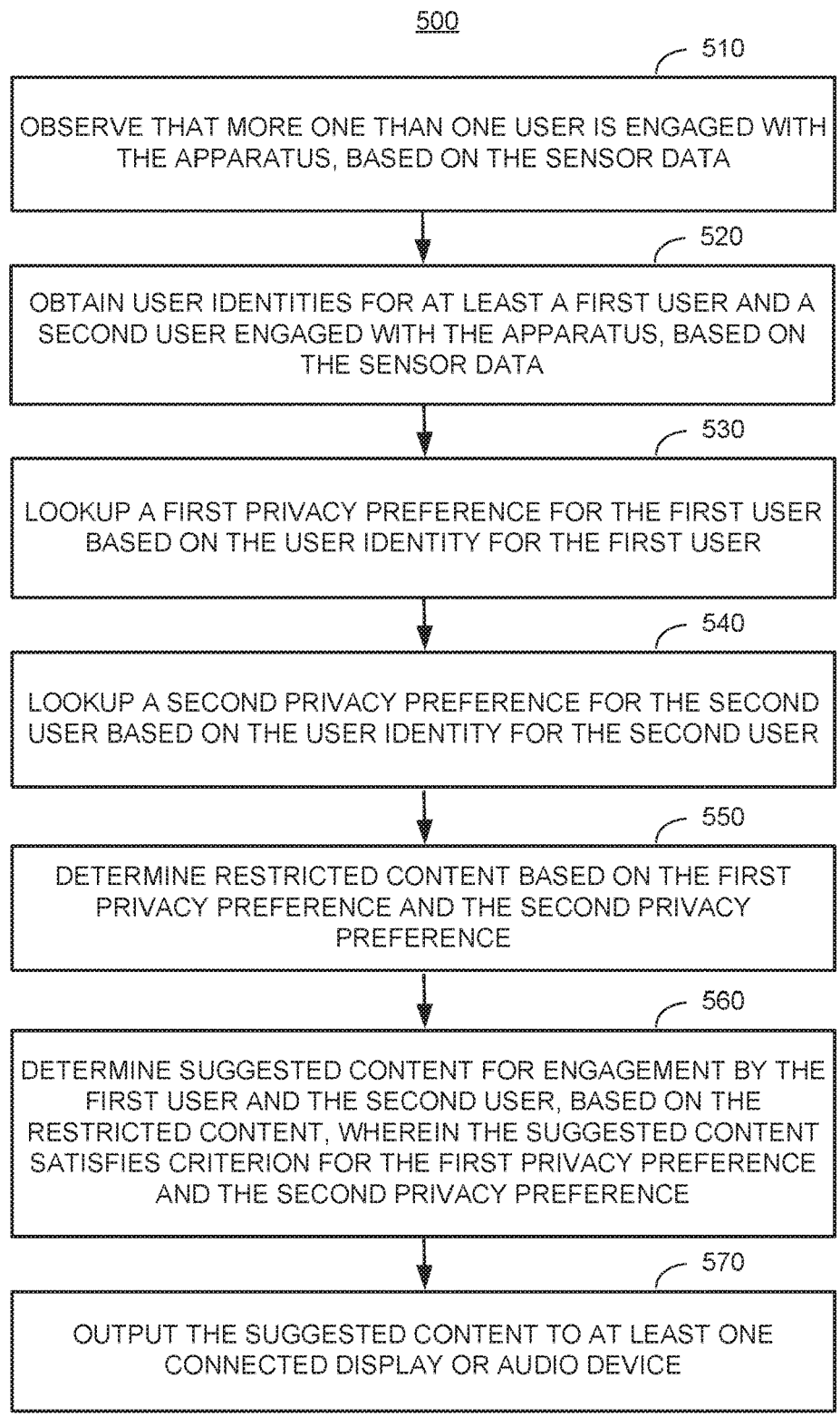
FIG. 5 illustrates an example methodology for maintaining privacy when providing media content to a group by a media distribution device.

FIG. 5 illustrates an example methodology 500 for maintaining privacy when providing media content to a group by a media distribution device. At step 510, the media distribution device observes that more one than one user is engaged with the apparatus, based on the sensor data.

At step 520, the media distribution device obtains user identities for at least a first user and a second user engaged with the apparatus, based on the sensor data. In some implementations, the first and second users are registered users.

In some implementations, the media distribution device determines the first privacy preference by receiving user input from the first user. The media distribution device can record a log of user reactions by the first user for media content over a period of time, and automatically determine the first privacy preference based on the sensor data. In some implementations, the user reactions by the first user can be based on sensor data from a camera for facial expressions of the first user. The user reactions by the first user can be based on sensor data from a microphone for positive or negative voice reactions of the first user.

In some implementations, the media distribution device records a log of user reactions by the second user for media content over a period of time, and automatically determines the second privacy preference based on the sensor data.

At step 530, the media distribution device looks-up a first privacy preference for the first user based on the user identity for the first user. In some implementations, the first privacy preference is further based on whether the first user is anonymous to the second user.

At step 540, the media distribution device looks-up a second privacy preference for the second user based on the user identity for the second user. In some implementations, the second user is engaged with the apparatus at the first location. The second user can be engaged with the apparatus from a remote location over a network. The second user can be an unregistered user and the second privacy preference can be unspecified. In some implementations, the first privacy preference and the second privacy preference each include a list of private topics.

At step 550, the media distribution device determines restricted content based on the first privacy preference and the second privacy preference.

At step 560, the media distribution device determines suggested content for engagement by the first user and the second user, based on the restricted content, where the suggested content satisfies criterion for the first privacy preference and the second privacy preference. In some implementations, the media distribution device prevents the second user from matching with the first user for online engagement with the restricted content.

At step 570, the media distribution device outputs the suggested content to at least one connected display or audio device. In some implementations, outputting the suggested content comprises censoring a portion of the suggested content in real time.

Figure 6:
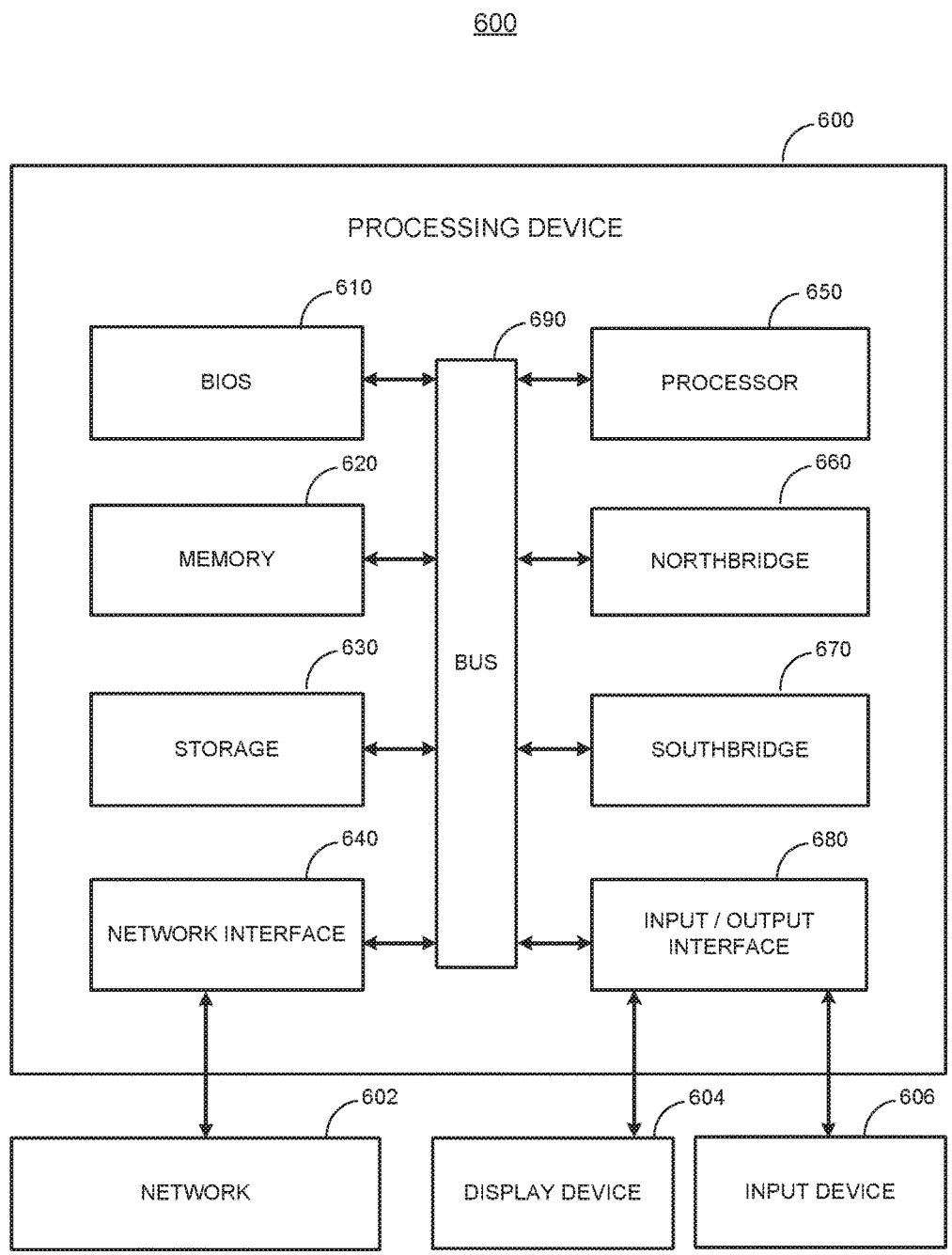
FIG. 6 illustrates a block diagram of an example processing device.

FIG. 6 illustrates a block diagram of an example processing device 600. The processing device 600 can include a Basic Input/output System (BIOS) 610, a memory 620, a storage 630, a network interface 640, a processor 650, a northbridge 660, a southbridge 670, and an input/output (IO) interface 680.

The processing device 600 can be any apparatus for processing data, such as for example, a server computer (e.g., one of many rack servers in a data center), a personal computer, a laptop computer, a smartphone, a tablet, an entertainment console, a wearable device, or a set top box. The processor (e.g., central processing unit (CPU)) 650 can be a chip on a motherboard that can retrieve and execute programming instructions stored in the memory 620. The processor 650 can be a single CPU with a single processing core, a single CPU with multiple processing cores, or multiple CPUs. One or more buses 690 can transmit instructions and application data between various computer components such as the processor 650, memory 620, storage 630, and networking interface 640.

The memory 620 can include any physical device used to temporarily or permanently store data or programs, such as various forms of random-access memory (RAM). The storage 630 can include any physical device for non-volatile data storage such as a HDD or a flash drive. The storage 630 can often have greater capacity than the memory 620 and can be more economical per unit of storage, but can also have slower data transfer rates.

The BIOS 610 can include a Basic Input/Output System or its successors or equivalents, such as an Extensible Firmware Interface (EFI) or Unified Extensible Firmware Interface (UEFI). The BIOS 610 can include a BIOS chip located on a motherboard of the processing device 600 storing a BIOS software program. The BIOS 610 can store firmware executed when the computer system is first powered on along with a set of configurations specified for the BIOS 610. The BIOS firmware and BIOS configurations can be stored in a non-volatile memory (e.g., NVRAM) 612 or a ROM such as flash memory. Flash memory is a non-volatile computer storage medium that can be electronically erased and reprogrammed.

The BIOS 610 can be loaded and executed as a sequence program each time the processing device 600 is started. The BIOS 610 can recognize, initialize, and test hardware present in a given computing system based on the set of configurations. The BIOS 610 can perform self-test, such as a Power-on-Self-Test (POST), on the processing device 600. This self-test can test functionality of various hardware components such as hard disk drives, optical reading devices, cooling devices, memory modules, expansion cards and the like. The BIOS can address and allocate an area in the memory 620 in to store an operating system. The BIOS 610 can then give control of the computer system to the OS.

The BIOS 610 of the processing device 600 can include a BIOS configuration that defines how the BIOS 610 controls various hardware components in the processing device 600. The BIOS configuration can determine the order in which the various hardware components in the processing device 600 are started. The BIOS 610 can provide an interface (e.g., BIOS setup utility) that allows a variety of different parameters to be set, which can be different from parameters in a BIOS default configuration. For example, a user (e.g., an administrator) can use the BIOS 610 to specify dock and bus speeds, specify what peripherals are attached to the computer system, specify monitoring of health (e.g., fan speeds and CPU temperature limits), and specify a variety of other parameters that affect overall performance and power usage of the computer system.

The I/O interface 680 allows the processing device 600 to connect with I/O devices such as a keyboard, a mouse, a remote control, a controller, a microphone, a television, a head mounted display (HMD), and/or a monitor, etc.

The northbridge 660 can be a chip on the motherboard that can be directly connected to the processor 650 or can be integrated into the processor 650. In some instances, the northbridge 660 and the southbridge 670 can be combined into a single die. The northbridge 660 and the southbridge 670, manage communications between the processor 650 and other parts of the motherboard. The northbridge 660 can manage tasks that require higher performance than the southbridge 670. The northbridge 660 can manage communications between the processor 650, the memory 620, and video controllers (not shown). In some instances, the northbridge 660 can include a video controller.

The southbridge 670 can be a chip on the motherboard connected to the northbridge 660, but unlike the northbridge 660, is not directly connected to the processor 650. The southbridge 670 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the processing device 600. The southbridge 670 can be connected to or can include within the southbridge 670 the I/O interface 670, Direct Memory Access (DMAs) controllers, Programmable Interrupt Controllers (PICs), and a real-time dock.

The input device 602 can be at least one of a game controller, a remote controller, a joystick, a mouse, a keyboard, a touchscreen, a trackpad, or other similar control device. The input device 602 allows a user to provide input data to the processing device 600.

The display device 604 can be at least one of a monitor, a light-emitting display (LED) screen, a liquid crystal display (LCD) screen, a head mounted display (HMD), a virtual reality (VR) display, a augmented reality (AR) display, or other such output device. The display device 604 allows the processing device 600 to output visual information to a user.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. An apparatus for maintaining privacy when providing media content to a group, the apparatus comprising:

at least one sensor that detects data at a first location, the sensor data identifying at least a first user engaged with a second user;

a network interface that communicates over a communication network to obtain one or more user histories for the first user and for the second user from one or more respective social media providers, each user history concerning behaviors of the respective user in relation to topics on which the respective user engaged with the respective social network provider;

a memory;

a processor that executes instructions stored in the memory, wherein execution of the instructions by the processor:

generates a first set of privacy preferences based on the user histories for the first user, wherein at least one privacy preference in the first set identifies a level of privacy indicated by behavior patterns of the first user in relation to a respective topic, generates a second set of privacy preferences based on the user histories for the second user, wherein at least one privacy preference in the second set identifies a level of privacy indicated by behavior patterns of the second user in relation to a respective topic, identifies restricted content from a library of available content based on a list of topics associated with the first set of privacy preferences and the second set of privacy preferences, and generates a social activity suggestion based on the identified restricted content, the social activity suggestion specifying suggested content for engagement by the first user and the second user, wherein the suggested content satisfies the level of privacy identified by the first set of privacy preferences and by the second set of privacy preferences; and a display or audio device that outputs the suggested content in accordance with the first set of privacy preferences and the second set of privacy preferences.

2. The apparatus of claim 1, wherein the processor generates the first set of privacy preferences further based on user input from the first user.

3. The apparatus of claim 1, wherein the processor further records a log of user reactions by the first user for media content over a period of time, wherein the processor generates the first set of privacy preferences further based on sensor data.

4. The apparatus of claim 3, wherein the processor further identifies the user reactions by the first user based on the sensor data as captured by a camera, the user reactions including facial expressions of the first user.

5. The apparatus of claim 3, wherein the processor further identifies the user reactions by the first user based on the sensor data as captured by a microphone, the user reactions including positive or negative voice reactions of the first user.

6. The apparatus of claim 1, wherein the second user is engaged with the apparatus at the first location.

7. The apparatus of claim 1, wherein the second user is engaged with the apparatus from a remote location over the communication network.

8. The apparatus of claim 1, wherein the processor is further configured to prevent the second user from matching with the first user for online engagement with the restricted content.

9. The apparatus of claim 1, wherein the first and second users are registered users.

10. The apparatus of claim 1, wherein the second user is an unregistered user.

11. The apparatus of claim 1, wherein the processor generates the first set of privacy preferences further based on whether the first user is anonymous to the second user.

12. The apparatus of claim 1, wherein the first set of privacy preferences and the second privacy preference each include a list of private topics.

13. The apparatus of claim 1, wherein the display or audio device outputs the suggested content by censoring a portion of the suggested content in real-time.

14. A method for maintaining privacy when providing media content to a group via a media distribution device, the method comprising:
   detecting data at a first location from at least one sensor, the sensor data identifying at least a first user engaged with a second user;
   obtaining one or more user histories for the first user and the second user from one or more respective social media providers, each user history concerning behaviors of the respective user in relation to topics on which the respective user engaged with the respective social network provider;
   generating a first set of privacy preferences based on the user histories for the first user, wherein at least one privacy preference in the first set identifies a level of privacy indicated by behavior patterns of the first user in relation to a respective topic;
   generating a second set of privacy preferences based on the user histories for the second user, wherein at least one privacy preference in the second set identifies a level of privacy indicated by behavior patterns of the second user in relation to a respective topic;
   identifying restricted content from a library of available content based on the first set of privacy preferences and the second set of privacy preferences;
   generating a social activity suggestion based on the identified restricted content, the social activity suggestion specifying suggested content for engagement by the first user and the second user, wherein the suggested content satisfies the level of privacy identified by the first set of privacy preferences and by the second set of privacy preferences; and
   outputting the suggested content by a display or audio device content in accordance with the first set of privacy preferences and the second set of privacy preferences.

15. The method of claim 14, wherein generating the first set of privacy preferences is further based on user input from the first user.

16. The method of claim 14, further comprising recording a log of user reactions by the first user for media content over a period of time wherein generating the first set of privacy preferences is further based on sensor data.

17. The method of claim 16, further comprising identifying the user reactions by the first user based on the sensor data as captured by a camera, wherein the user reactions include facial expressions of the first user.

18. The method of claim 16, further comprising identifying the user reactions by the first user based on the sensor data as captured by a microphone, wherein the user reactions include positive or negative voice reactions of the first user.

19. A non-transitory computer-readable storage medium, having embodied thereon a program executable by a processor to perform a method for maintaining privacy when providing media content to a group via a media distribution device, the method comprising:
   detecting data at a first location from at least one sensor, the sensor data identifying at least a first user engaged with a second user;
   obtaining one or more user histories for the first user and the second user from one or more respective social media providers, each user history concerning behaviors of the respective user in relation to topics on which the respective user engaged with the respective social network provider;
   generating a first set of privacy preferences based on the user histories for the first user, wherein at least one privacy preference in the first set identifies a level of privacy indicated by behavior patterns of the first user in relation to a respective topic;
   generating a second privacy preferences based on the user histories for the second user, wherein at least one privacy preference in the second set identifies a level of privacy indicated by behavior patterns of the second user in relation to a respective topic;
   identifying restricted content from a library of available content based on the first set of privacy preferences and the second set of privacy preferences;
   generating a social activity suggestion based on the identified restricted content, the social activity suggestion specifying suggested content for engagement by the first user and the second user, wherein the suggested content satisfies the level of privacy identified by the first set of privacy preferences and by the second set of privacy preferences; and
   outputting the suggested content by a display or audio device content in accordance with the first set of privacy preferences and the second set of privacy preferences.

* * * * *